United States Patent
Breuer et al.

(10) Patent No.: US 10,343,779 B2
(45) Date of Patent: Jul. 9, 2019

(54) AIRCRAFT INTERIOR DOOR ASSEMBLY

(71) Applicant: Airbus Operations GmbH, Hamburg (DE)

(72) Inventors: Matthias Breuer, Hamburg (DE); Sabrina Moje, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 288 days.

(21) Appl. No.: 15/114,740

(22) PCT Filed: Jan. 29, 2015

(86) PCT No.: PCT/EP2015/051803
§ 371 (c)(1),
(2) Date: Jul. 27, 2016

(87) PCT Pub. No.: WO2015/114048
PCT Pub. Date: Aug. 6, 2015

(65) Prior Publication Data
US 2016/0340043 A1 Nov. 24, 2016

(30) Foreign Application Priority Data

Jan. 30, 2014 (EP) .................... 14153191

(51) Int. Cl.
*B64C 1/14* (2006.01)
*B64D 11/02* (2006.01)

(52) U.S. Cl.
CPC ............ *B64D 11/02* (2013.01); *B64C 1/1461* (2013.01); *B64C 1/1469* (2013.01)

(58) Field of Classification Search
CPC ...... B64C 1/1461; B64C 1/1469; B64D 11/02
See application file for complete search history.

(56) References Cited

U.S. PATENT DOCUMENTS

| 4,589,463 A | 5/1986 | Ryan |
| 8,720,827 B2 | 5/2014 | Boren |

(Continued)

FOREIGN PATENT DOCUMENTS

| CN | 1538031 A | 10/2004 |
| CN | 1747870 A | 3/2006 |

(Continued)

OTHER PUBLICATIONS

European Search Report, Extended European Search Report for European Patent Application No. 14153191.3 dated Jun. 5, 2014.

(Continued)

*Primary Examiner* — Nicholas McFall
(74) *Attorney, Agent, or Firm* — Lorenz & Kopf LLP (57) ABSTRACT

An aircraft interior door assembly (10, 20, 30) for selectively increasing usable space within an aircraft lavatory (1) adjacent a passenger doorway area (2) of the aircraft or in the passenger doorway area (2) adjacent the lavatory (1) comprises a door element (12, 22, 32) and a door element supporting structure (13, 23, 33). The door element (12, 22, 32) is rotatably mounted to the door element supporting structure (13, 23, 33) so as to be at least rotatable between first and second closed positions relative to the door element supporting structure (13, 23, 33). The door element (12, 22, 32) has the same configuration in both of its closed positions. A door rotation space which is encompassed by the door element (12, 22, 32) when positioned in its first and second closed positions or rotated through by the door element (12, 22, 32) when rotated between its first and second closed positions is part of the aircraft lavatory interior space, when the door element (12, 22, 32) is in its first closed position, and is part of the passenger doorway area (2), when the door element (12, 22, 32) is in its second closed position.

15 Claims, 7 Drawing Sheets

(56) References Cited

U.S. PATENT DOCUMENTS

| | | |
|---|---|---|
| 2004/0206000 A1 | 10/2004 | Yamamoto |
| 2005/0116099 A1* | 6/2005 | Pho ........................ B64D 11/02 244/118.5 |
| 2013/0081330 A1 | 4/2013 | Ivester et al. |
| 2013/0206906 A1 | 8/2013 | Burrows et al. |

FOREIGN PATENT DOCUMENTS

| | | |
|---|---|---|
| EP | 2711295 A2 | 3/2014 |
| JP | H1113178 | 1/1999 |
| WO | 2004056648 A1 | 7/2004 |

OTHER PUBLICATIONS

People's Republic of China, Chinese Office Action for Chinese Patent Application No. 201480004926.0 dated Mar. 27, 2017.

* cited by examiner

AIRCRAFT INTERIOR DOOR ASSEMBLY

CROSS-REFERENCE TO RELATED APPLICATIONS

This is a bypass continuation of International Application No. PCT/EP2015/051803, filed Jan. 29, 2015, which application claims priority to European Application No. 14153191.3, filed Jan. 30, 2014, which are hereby incorporated by reference in their entirety.

TECHNICAL FILED

The embodiments described herein relate to an aircraft interior door assembly for selectively increasing usable space within an aircraft lavatory adjacent a passenger doorway area of the aircraft or in the passenger doorway area adjacent the lavatory and to an aircraft lavatory located adjacent a passenger doorway area of an aircraft and provided with such an aircraft interior door assembly.

BACKGROUND

In addition, other objects, desirable features and characteristics will become apparent from the subsequent summary and detailed description, and the appended claims, taken in conjunction with the accompanying drawings and this background.

There is a continuous demand for improved lavatory comfort within the limited space provided in an aircraft. In this regard, it is a goal to provide enough room within an aircraft lavatory for allowing passengers to change clothes, to change diapers, and also to refresh themselves within the lavatory. Accordingly, there is the need to increase the size of the lavatory at least when the cruising altitude is reached.

At the same time, this demand is limited by law and airline regulations, such as evacuation regulations, prescribing certain dimensions for the aircraft aisles, and especially the cross aisles connecting two opposed aircraft doors.

From document U.S. Pat. No. 4,589,463, a door construction for closing an aircraft lavatory, developed to improve the lavatory comfort under these constraints, is already known. The door of U.S. Pat. No. 4,589,463 is composed of three door panels, the second of which is pivotally mounted to the first and the third of which is pivotally mounted to the second. This door can be positioned in a first configuration in which only the first and second door panels are used for closing the lavatory and the third door panel is folded onto the second door panel and a second configuration in which all three door panels are used for closing the lavatory and all three door panels are positioned outside the lavatory interior space enclosed by lavatory monument walls and the first configuration door. Thereby, the volume of the lavatory interior space is increased when the door is in its second closed configuration

SUMMARY

In view of the above, it is an object of the present application to improve the lavatory comfort on the one hand by increasing the lavatory interior space when the lavatory may be used and to also increase the aisle and assist space, i.e., the space where the crew members stand during boarding and alighting in order to assist the passengers, and on the other hand when the lavatory may not be used due to the airline regulations.

This object is achieved by an aircraft interior door assembly for selectively increasing useable space within an aircraft lavatory adjacent a passenger doorway area of the aircraft or in the passenger doorway area adjacent the lavatory as defined in enclosed independent claim 1 and an aircraft lavatory as defined in enclosed independent claim 15. According to the present application, the passenger doorway area is a section of an aircraft aisle next to an aircraft door through which passengers enter or leave the aircraft.

The aircraft interior door assembly according to the present application is designed for selectively increasing usable space within an aircraft lavatory located adjacent a passenger doorway area of the aircraft or in the passenger doorway area adjacent the lavatory. Therefore, the aircraft interior door assembly comprises a door element and a door element supporting structure. The door element is rotatably mounted to the door element supporting structure so as to be rotatable between a first closed position relative to the door element supporting structure and a second closed position relative to the door element supporting structure. "Closed position" means here that the room provided with the door assembly, which preferably is an aircraft lavatory, is closed by the door element. In the following, reference is only made to an aircraft lavatory, even though the said below also applies for the explained door assembly being provided to close any other room, especially any other room within an aircraft or any other means of transport underlying similar space limitations. Such a room may be provided adjacent any limited-space area, such as a passageway or aisle. Also for the special case of an aircraft lavatory provided with the door assembly, this lavatory need not necessarily be situated adjacent a passenger doorway area of the aircraft but may also be adjacent any other aircraft aisle or seat-free area. According to the present application, there are therefore two different positions of the door element in which it closes the lavatory it is provided with. As the door element is rotatably mounted to the door element supporting structure, the two closed positions differ in its degree of rotation relative to the door element supporting structure and also relative to the lavatory provided with the door assembly.

In contrast to the door described in U.S. Pat. No. 4,589,463 and according to the present application, the door element has a configuration which remains the same irrespective of the position it is rotated in. In other words, irrespective of the door element being positioned in its first or second closed position or in an open position allowing unobstructed access to the lavatory provided with the door assembly, the door element does not change its configuration.

A door rotation space is defined in the following as the space encompassed by the door element when positioned in its first and second closed positions or rotated through by the door element when rotated between its first and second closed positions. For example, if the door element has the form of a usual door blade, the door rotation space is the space rotated through when the door blade is rotated between its first and second positions. The door element may, for example, also be realized as a semi-circular revolving tube or as two quarters of a circular tube abutting one another in the closed door positions and rotatable against one another between these closed positions. If this is the case, the door rotation space is the space encompassed by the door element when positioned in its first and second closed positions.

According to the present application, this door rotation space is part of the aircraft lavatory interior space, when the door element is in its first closed position, and is part of the passenger doorway area adjacent the lavatory, when the door element is in its second closed position. Thereby, the passenger comfort can be advantageously increased during a flight, wherein, during taxi, take-off and landing, the aisle space in front of the lavatory is increased in turn, as the door element may then be positioned in its second closed position. Thereby, also the airline evacuation regulations are met.

The space added to the aisle space, when the door element closes an aircraft lavatory located adjacent a passenger doorway area in its second closed position, may advantageously be used as assist space for the crew during passengers entering or leaving the aircraft. Thereby, the assist space is relocated from the aisle so that the aisle width may be reduced to a minimum in consideration of the aisle dimensions prescribed by law and the airline regulations. Preferably, the door element, by default, is located in its second closed position such that the door rotation space, by default, is part of the passenger doorway area adjacent the lavatory and hence provides an assist space suitable to accommodate a crew member in a standing position. Thus, the door element preferably is adapted to be brought into its first closed position only when the lavatory is in use. Such a configuration of the door element, in particular when the door element has the same configuration irrespective of the position it is rotated in, ensures that, in an emergency, it is not necessary for the crew members to reconfigure the door assembly in order to generate an assist space. Instead, the assist space, by default, is present and ready to be used except for the case that the lavatory is in use which, however, is only possible during cruising of the aircraft, when there is no need for an assist space. This allows the crew members to take the actions that are necessary in case of an emergency, such as opening the door and activating an emergency slide, within the required short time interval of typically 90 seconds.

Preferably, the door element is lockable relative to the door element supporting structure at least in its first closed position, i.e., the position in which an aircraft lavatory interior space is increased. However, it is also conceivable that the door element is lockable relative to the door element supporting structure in both of its closed positions. In this regard, the door element, when in its first closed position, may be lockable from inside the lavatory by a passenger occupying the lavatory and, when positioned in its second closed position, may be lockable from outside the lavatory, such as from the passenger doorway area side, for example by a crew member. Any known locking mechanism may be used. A locking mechanisms for locking the door element in its first closed position which is operable only from inside the lavatory ensures that the door element is locked in its first closed position only when the lavatory is in use, whereas, the door element, by default, is arranged and preferably locked in its second closed position wherein the door rotation space provides an assist space suitable to accommodate a crew member in a standing position.

The door rotation space preferably has the form of at least a sector of a circular cylinder. When, for example, the door element is realized as a usual door blade, the door rotation space may take the form of a certain sector of a circular cylinder, depending on the rotation degree between the door blade first and second closed positions. However, in case the door element is for example a semi-circular revolving tube or composed of two quarters of a circular tube turnable against one another, i.e., a semi-circular tube split up into two halves, the door rotation space may have the form of a whole circular cylinder.

According to one embodiment, the rotation axis of the door element extends along an outer edge of the door element. For example, the door element in the form of a usual door blade may be rotatably connected with one edge thereof to the door element supporting structure. In this case, the edge of the door blade, opposed to the one rotatably connected to the door element supporting structure, can cooperate in the closed positions of the door with an area of the door element supporting structure. In this regard, it is conceivable that the door element supporting structure comprises a door opening, such as a door frame, relative to which the door element is rotatable between its closed positions. Within this door opening, the door element may be positioned in its first and second closed positions. However, such a door opening defined by the door element supporting structure is not necessary. According to an alternative, the door element supporting structure, besides rotatably mounting the door element, only provides a door element cooperating area for cooperating with the door element in order to be positioned in its first and second closed positions. In case of the door element being a door blade, this door element cooperating area may have the form of a sector section of a circular cylinder barrel.

Generally, i.e., irrespective of the actual door layout, in case the door element supporting structure does not circumscribe a whole door opening but only certain parts thereof, such as a rotatable mount of the door element and/or the door element cooperating area, other parts of the aircraft structure, such as at least one of at least a section of a lavatory monument assembly, a passenger compartment ceiling section and a passenger compartment floor section, define the remaining parts of such a door opening so that the door element, when in one of its closed positions, is able to close the aircraft lavatory provided therewith.

According to another embodiment of the present application, the door element supporting structure defines at least a width of a door opening for accommodating the door element, wherein the above said still applies, namely that the door element supporting structure does not necessarily circumscribe the whole door opening. Within this door opening width, a rotation axis of the door assembly door element extends mid-span and in particular perpendicular thereto.

The door element to be accommodated in such door opening width may be a semi-circular tube preferably rotatable around a central longitudinal rotation axis. However, it is also conceivable for the door element to be designed as two quarters of a circular tube cooperating together and abutting one another in the closed positions of the door element. In other words, the semi-circular tube may also be split up into two equal parts turnable against one another preferably around a central longitudinal rotation axis. In these cases, the door element rotation axis preferably is a longitudinal axis extending generally centrally through the door rotation space being a circular cylinder. When rotated between its first and second closed positions, the door element in form of a semi-circular tube may be rotated in one or the other direction around its rotation axis; i.e., to the left or to the right. In contrast thereto, if the door element is designed as two quarters of a circular tube, these two parts of the door element are advantageously rotatable in different, i.e., opposed directions, so as to rotate the door element between its first and second closed positions. In other words, the two circular tube quarters are rotated away from one another from the first closed position into the second closed position and vice-versa. In this regard, two longitudinal edges of the two circular tube quarters forming the door element abut one another in the first closed position of the door element and the other two longitudinal edges of the circular tube quarters abut in the second closed position of the door element.

Irrespective of the door element being realized as a semi-circular tube or two quarters of a circular tube or even having any other shape as long as its rotation axis extends mid-span within the door opening width of the door element supporting structure, the door element may define an access area in the form of the door rotation space, when in its second closed position. In other words, for the door element being realized as a semi-circular tube or two quarters of a circular tube, the door element may allow a passenger to enter an imaginary room of a circular cylinder shape and, from this access area, operate the door element to rotate from its second closed position into its first closed position, thereby entering the lavatory interior space. The door element may be operated manually or automatically, such as by activating a button. However, it is also conceivable that, by the passenger entering the access area or at least by entering a door element close region of the access area, the door element is automatically activated so as to rotate from its second to its first closed position. The same is also possible from inside the lavatory. If a passenger occupying the lavatory unlocks the door element and steps close to the door element in its first closed position, the door element may thereby be automatically activated so as to rotate back from its first closed position into its second closed position. Alternatively, the passenger may press a button or operate the door element manually in order to leave the lavatory.

The door element may further have a pivot axis extending in parallel to the door element rotation axis in an edge region of the door element. Such pivot axis preferably extends in an edge region of a door opening of the lavatory provided with the door assembly and allows the door element to swing open at least from its first closed position. This is especially conceivable for the door element being designed as a semi-circular tube. In this regard, the pivot axis may extend along an edge of the semi-circular tube so that the semi-circular tube may be swung open similar to a usual (curved) door blade. The semi-circular tube door element may therefore be mounted rotatably about its rotation axis to a door element frame constituting a part of the door element supporting structure and pivotally mounted to a further part of the door element supporting structure at one edge thereof around the pivot axis.

In some of the embodiments explained above, the door element, in addition to its first and second closed positions, may also be positioned (by rotating or pivoting) into an open position relative to the door element supporting structure. This is especially true for the door element having a lateral rotation/pivot axis, such as the one being designed as a usual door blade or as a semi-circular tube having a pivot axis at one edge thereof. When the door element may be turned into an open position so as to allow unobstructed access to the lavatory provided with the door assembly, the second closed position of the door element in which the door rotation space is part of the passenger doorway area in front of the aircraft lavatory provided with the door assembly may only be used when it is not allowed for the passengers to use the lavatories, i.e., during taxi, take-off and landing as well as in certain emergency situations during which the aircraft aisles have to be free and also during passengers entering or leaving the aircraft.

Not only in the above described cases but also irrespective of the actual door element design, the door element may be rotated between its closed positions manually or automatically. As already mentioned for the door element being a semi-circular tube or being composed of two quarters of a circular tube, the door element may be rotated by pressing a button or even fully automatically as soon as a passenger has entered a door close region of the above defined access area. However, also for the door element configurations allowing the door element to be swung into an open position, i.e., a position different from the first and second closed positions, the door element which is usually closed, except for a passenger actually entering the lavatory, especially may be automatically rotated from its first closed position into its second closed position and preferably locked in this position, as soon as the lavatory may no longer be used during the flight and also during ground operation including the time passengers enter or leave the aircraft.

In general, the door element supporting structure may be a part of a lavatory monument assembly and/or of structural components of the aircraft, such as a floor or a ceiling section. In this case, the lavatory monument assembly or parts of the aircraft structure may define the door opening alone or in cooperation with one another.

According to the application, an aircraft lavatory located adjacent a passenger doorway area of the aircraft is provided with an aircraft interior assembly as described in the foregoing.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

FIGS. 1, 2, 4, 5 and 7 show a lavatory 1 provided in the rear section of an aircraft adjacent a passenger doorway area 2 of the aircraft. According to each of FIGS. 1, 2, 4, 5 and 7, the lavatory 1 is provided with a different embodiment of an aircraft interior door assembly 10, 20, 20', 30, 40 for selectively increasing usable space within the aircraft lavatory 1 adjacent the passenger doorway area 2 of the aircraft or in the passenger doorway area 2 adjacent the lavatory 1.

Each aircraft interior door assembly 10, 20, 20', 30, 40, as shown in FIGS. 1, 2, 4, 5 and 7, comprises a door element 12, 22, 22', 22", 32, 42', 42" and a door element supporting structure 13, 23, 33, 43. The door element supporting structure 13, 23, 33, 43 of each of the aircraft interior door assemblies 10, 20, 20', 30, 40 as shown in FIGS. 1, 2, 4, 5 and 7, may be a part of a lavatory monument assembly and/or of structural components of the aircraft, such as a floor or a ceiling section. The door element 12, 22, 22', 22", 32, 42', 42" of each of the shown aircraft interior door assemblies 10, 20, 20', 30, 40 is rotatably mounted to the door element supporting structure 13, 23, 33, 43 around a rotation axis 14, 24, 34, 44. Around this door element rotation axis 14, 24, 34, 44 the door element 12, 22, 22', 22", 32, 42 is at least rotatable between a first closed position, respectively shown in FIGS. 1A, 2B, 4B, 5A and 7B, and a second closed position, respectively shown in FIGS. 1B, 2A, 4A, 5B and 7A.

Figure 1A:
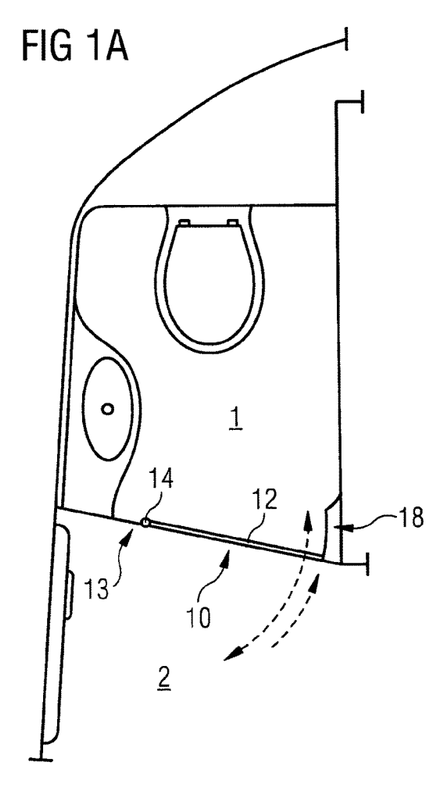
FIGS. 1A and 1B a top view of an aircraft lavatory located adjacent a passenger doorway area and provided with an aircraft interior door assembly having a door element in the form of a door blade, the door blade positioned in its first closed position and in its second closed position, FIGS. 2A and 2B a top view of an aircraft lavatory located adjacent a passenger doorway area and provided with an aircraft interior door assembly having a door element in the form of a semi-circular tube, the semi-circular tube positioned in its first closed position and in its second closed position, FIGS. 3A and 3B one possible configuration of a door element in the form of a semi-circular tube in a perspective and a side view, FIGS. 4A and 4B a top view of an aircraft lavatory located adjacent a passenger doorway area and provided with an aircraft interior door assembly having a door element in the form of approximately two quarters of a circular tube abutting one another in the closed door positions and rotatable against one another between its first closed position and its second closed position, FIGS. 5A and 5B a similar arrangement as shown in FIGS. 2A and 2B, wherein the semi-circular tube further is pivotable into an open position.
Figure 1B:
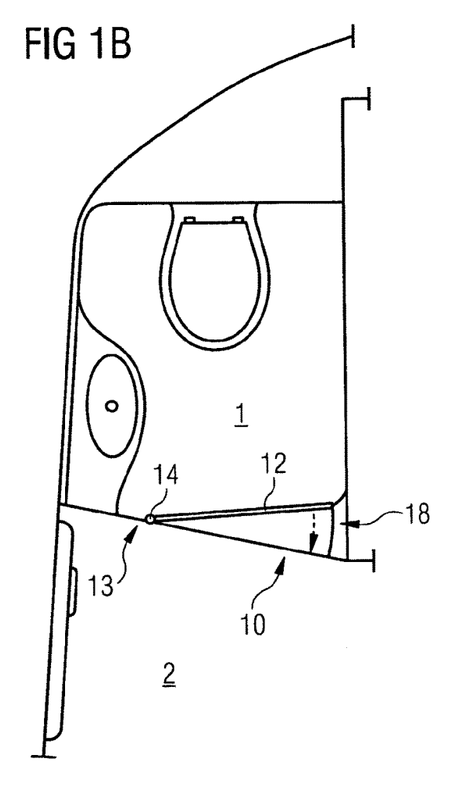

According to the embodiment as shown in FIGS. 1A and 1B, the door element 12 is realized as a simple door blade. The door element 12 according to this embodiment may be turned open from its first closed position and turned closed from the open position back to its first closed position when a passenger wants to enter the lavatory 1, and the lavatory 1 is then occupied. When this door blade 12 is rotated around its rotation axis 14 between its first and second closed positions, the door blade 12 is rotated through a door rotation space in the form of a sector of a circular cylinder. As known for usual door blades, the door rotation axis 14 extends along an outer edge of the door blade 12. In other words, the door blade 12 is rotatably connected with one edge thereof to the door element supporting structure 13. As shown in FIGS. 1A and 1B, a further edge of the door blade 12, opposed to the one rotatable connected to the door element supporting structure 13, cooperates in its closed positions with an area 18 of the door element supporting structure 13. This door element cooperating area 18 of the door element supporting structure 13 has the form of a sector section of the circular cylinder barrel. Thereby, the door blade 12 not only cooperates with the door element cooperating area 18 in both of its closed positions but also in between its first and second closed positions, so that clothes or fingers of passengers may not get caught between the door blade 12 and the door element cooperating area 18, when the door element 12 is rotated between its first and second closed positions. However, this configuration of the door element cooperating area 18 is not mandatory. Moreover, it is also conceivable that a door element cooperating area of the door element supporting structure 13 only cooperates with the door blade 12 in each of its first and second closed positions, but not during rotation of the door blade 12 between its first and second closed positions.

Figure 2A:
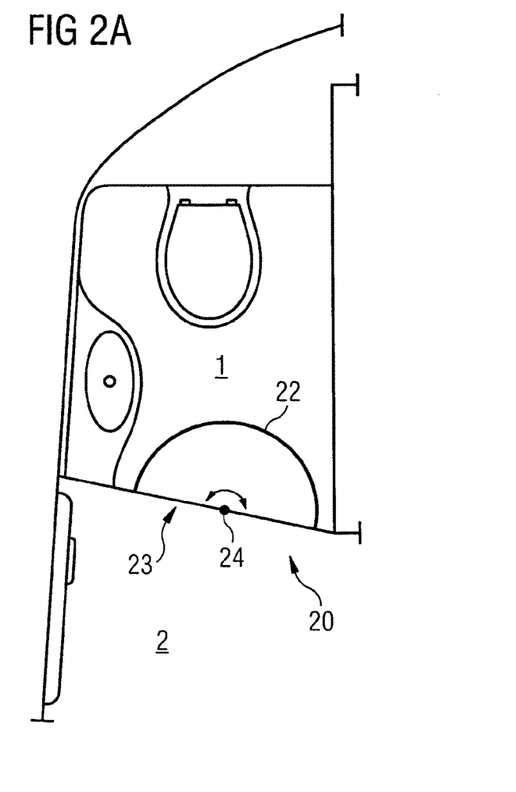
Figure 2B:
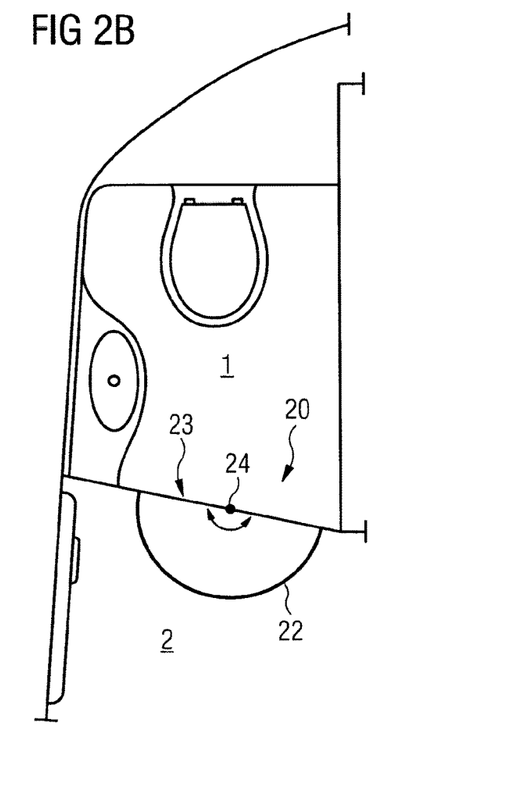

According to a further embodiment of the present application, shown in FIGS. 2A and 2B, the door element 22 is realized as a semi-circular tube. According to this embodiment, the door element supporting structure 23 at least defines a width of a door opening for accommodating the semi-circular tube 22. Mid-span within the door opening width, a rotation axis 24 of the semi-circular tube 22 extends generally perpendicular to the width. In other words, the semi-circular tube door element 22 has a generally central longitudinal axis 24 around which it is rotatable so that a door rotation space encompassed by the semi-circular tube door element 22 when position in its first and second closed positions has the form of a (whole) circular cylinder.

Figure 3A:
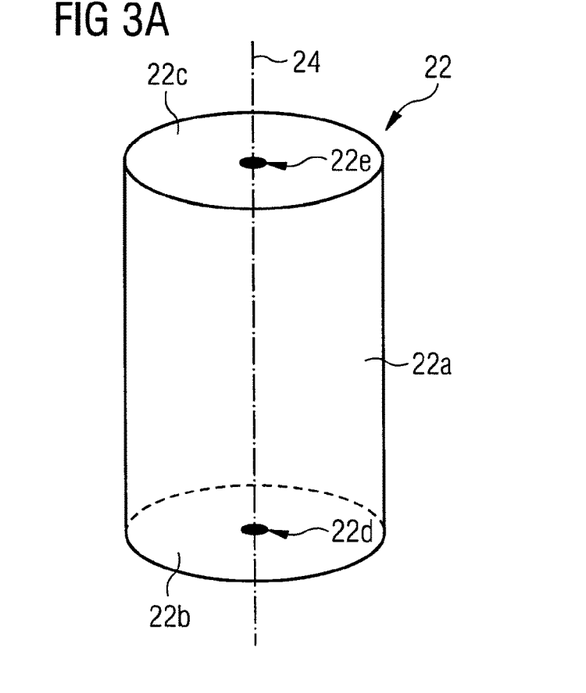
Figure 3B:
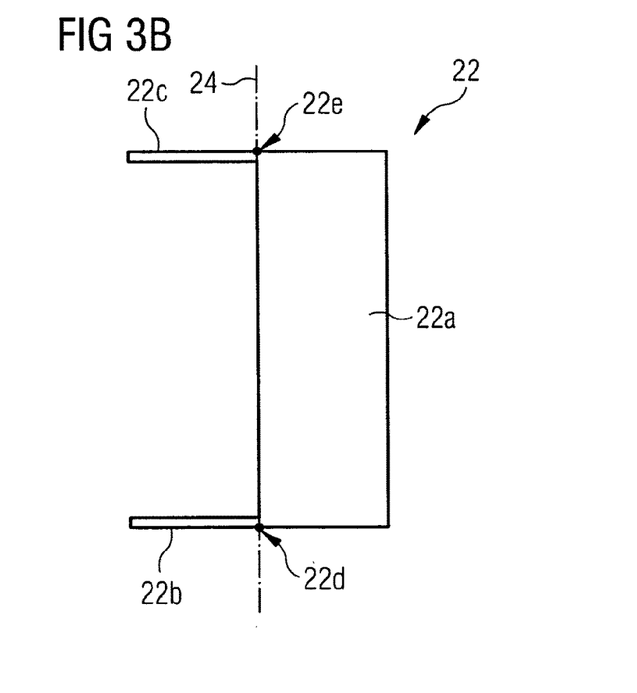
Figure 4A:
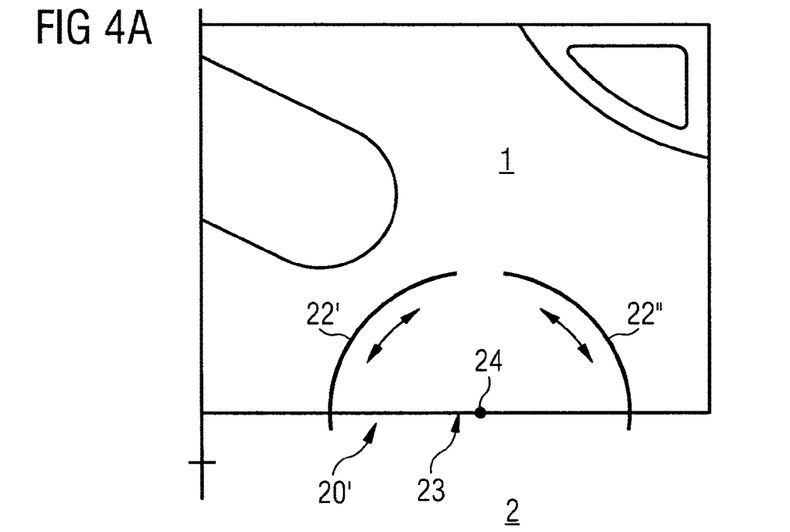
Figure 4B:
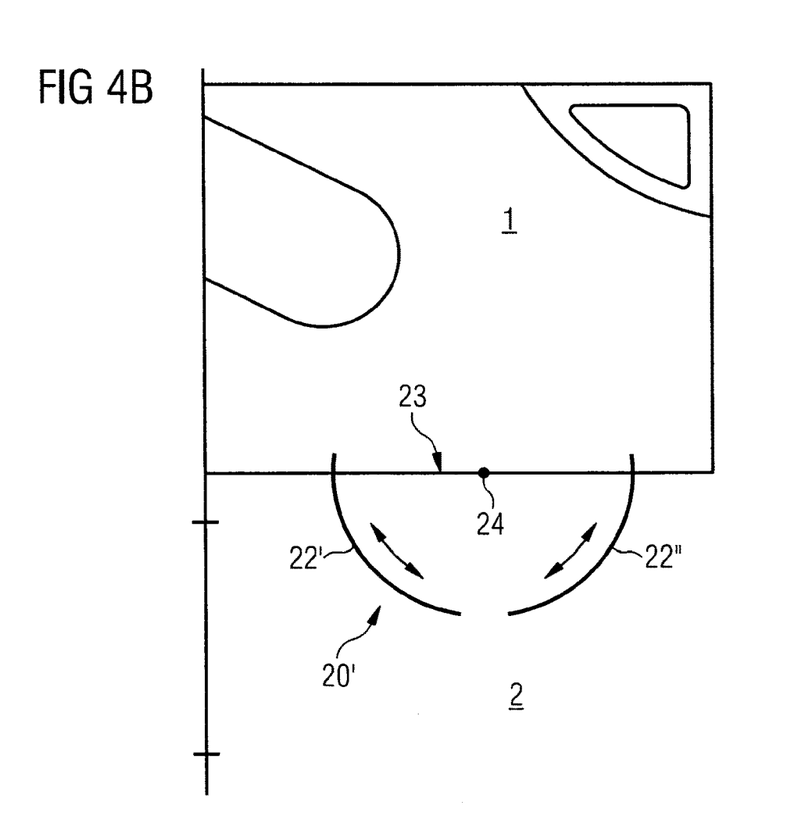

FIGS. 3A and 3B show a perspective and a side view of the door element 22 in the form of a semi-circular tube. According to FIGS. 3A and 3B, the semi-circular tube door element 22 is composed of a semi-circular cylinder barrel 22A extending between a circular bottom element 22B and a circular ceiling element 22c. Such a configuration of the semi-circular tube door element 22 has rotatable connecting points 22d and 22e located centered in the circular bottom and ceiling elements 22B and 22c. However, it is also conceivable that the semi-circular tube door element 22 as shown in FIGS. 3A and 3B is not provided with such a circular bottom element 22B. Then, a semi-circular bottom edge of the semi-circular cylinder barrel 22A may, for example, be guided within a ring-shaped recess in a floor element of the aircraft or the lavatory monument assembly, and the door element 22 may only be rotatably mounted at the ceiling rotation point 22e. Also the circular ceiling element 22c may be omitted as long as the rotatable mounting of the semi-circular tube door element 22 around the central longitudinal rotation axis 24 is realized in any other way. For example, this rotatable mounting may also be realized by at least one connecting strut connecting the semi-circular cylinder barrel 22A generally constituting the door element 22 to the door element rotation axis mount 22e As depicted in FIGS. 4A and 4B, the design of the semi-circular tube door element 22 of the embodiment shown in FIG. 2 may also be modified so as to be split up in two door elements 22', 22" designed as two quarters of a circular tube cooperating in the closed door positions and turnable against one another to be rotated between the door element's first and second closed positions. Otherwise, the structure and the function of the door assembly 20' according to FIGS. 4A and 4B correspond to the structure and the function of the door assembly 20 according to FIGS. 2A and 2B.

With regard to the semi-circular tube door element 22 shown in FIGS. 3A and 3B, it is desired that, when installed as a lavatory door element, the circular floor section which is part of the door rotation space is not rotated with the rotation of the door element 22 but remains fixed so that a passenger stepping into the door rotation space when the door element is in the first or second closed position, i.e., from inside or outside the lavatory, is not rotated with the door element 22. In other words, when a passenger enters an access area of the semi-circular tube door element 22 or the alternative semi-circular door element which is composed of two quarters of a circular tube, the access area defined in the form of the door rotation space, he or she may enter the lavatory 1 simply by turning the door element to his/her back and step ahead into the interior lavatory space.

Figure 5A:
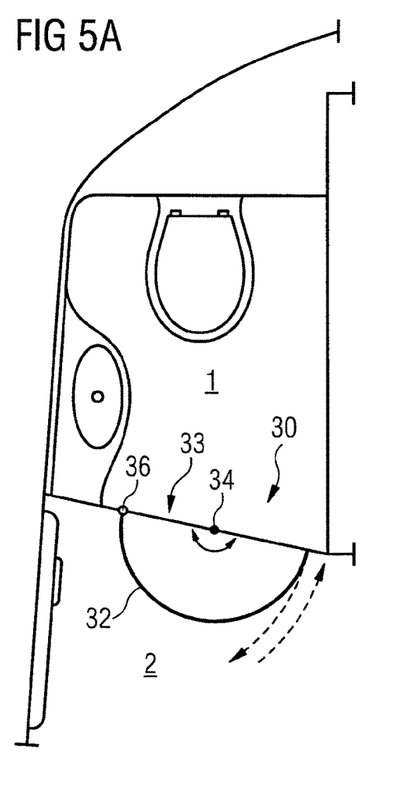
Figure 5B:
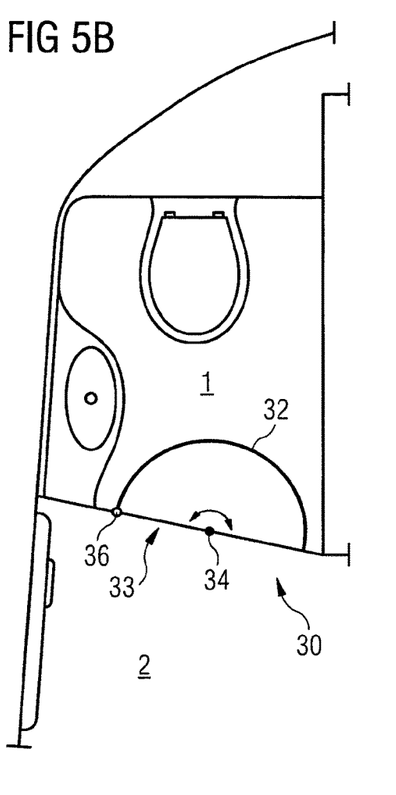

FIGS. 5A and 5B show a further embodiment of an aircraft interior door assembly 30 also comprising a semi-circular tube door element 32, the door element 32 being positioned and rotatable between its first and second closed positions in the same way as described with reference to FIGS. 2A and 2B. However, the semi-circular tube door element 32 shown in FIGS. 5A and 5B comprises a further longitudinal axis extending in parallel to the door element's central rotation axis 24, namely a pivot axis 36 extending along an edge of the semi-circular tube door element 32. According to this embodiment, the semi-circular tube door element 32 is not only rotatable between its first and second closed positions around the central rotation axis 34, but also pivotable into an open position by pivoting the door element 32 around its pivot axis 36. The semi-circular tube door element 32 may therefore be mounted rotatably about its rotation axis 34 to a door element frame (not shown) constituting a part of the door element supporting structure 33 and pivotally mounted to a further part of the door element supporting structure 33 at one edge thereof around the pivot axis 36.

In contrast to the embodiment of FIG. 2 and similar to the embodiment of FIG. 1, the semi-circular tube door element 32 according to this embodiment may be turned open from its first closed position and turned closed from the open position back to its first closed position when a passenger wants to enter the lavatory 1 and the lavatory 1 is then occupied. When in its first closed position, the semi-circular tube door element 32 is, as the door element shown in FIGS. 2A and 2B, rotatable into a second closed position. With regard to rotation between its first and second closed positions, the semi-circular tube door element 32 of this embodiment may be operated and arranged according to the embodiment depicted in FIG. 2.

Figure 6:
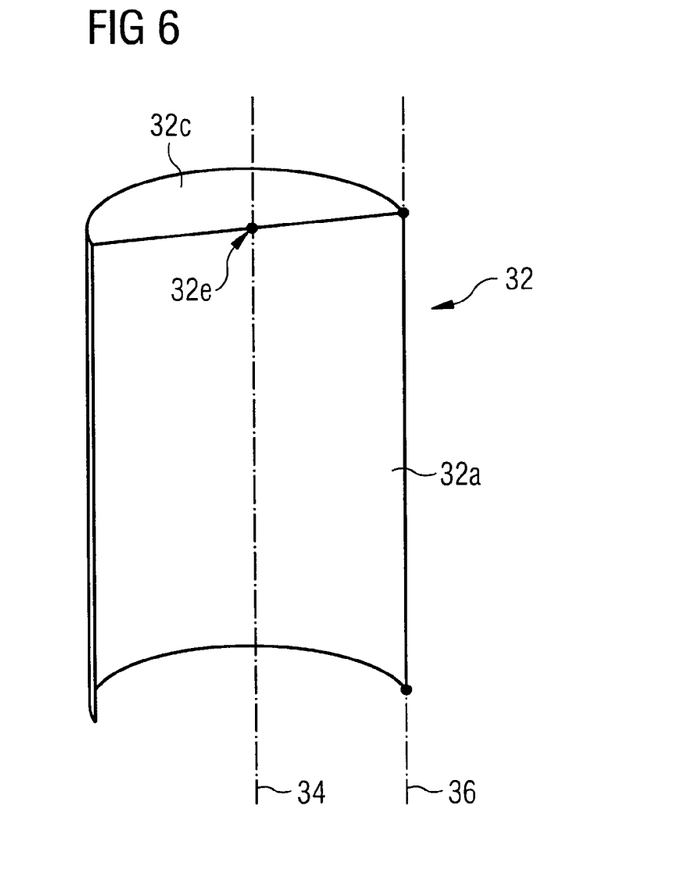
FIG. 6 is a perspective view of a possible configuration of the door element used in FIGS. 4A and 4B with its rotation and pivot axes, and FIGS. 7A and 7B a top view of an aircraft lavatory located adjacent a passenger doorway area and provided with an aircraft interior door assembly having a further alternatively designed door element shown in its first closed position and its second closed position.

With regard to its design, it is desirable to choose a door element configuration which generally corresponds to the one shown in FIGS. 3A and 3B, except for the fact that at least the circular bottom element 22B is omitted or reduced to a semi-circular bottom element. However, also the circular ceiling element 22c may be reduced to a semi-circular ceiling element. One possible door element configuration is shown in FIG. 5. In FIG. 6, a door element 32 having a semi-circular cylinder barrel 32A and a respective semi-circular ceiling element 32c but no bottom element is depicted. The semi-circular ceiling element 32c may also be omitted as long as the rotatable mounting of the semi-circular tube door element 32 around the central longitudinal rotation axis 34 is realized in any other way. For example, this rotatable mounting may also be realized by at least one connecting strut connecting the semi-circular cylinder barrel 32A generally constituting the door element 32 to the door element rotation axis mount 32e.

Figure 7A:
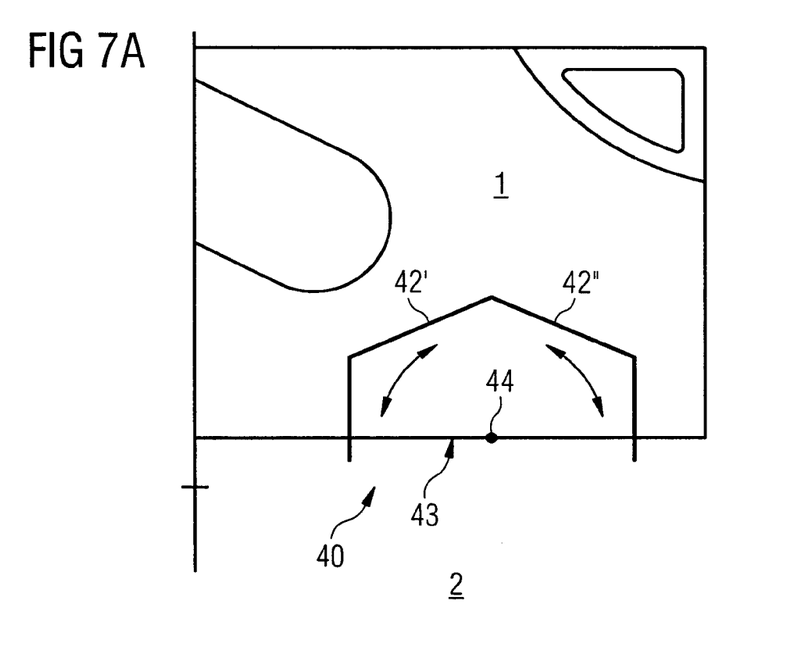
Figure 7B:
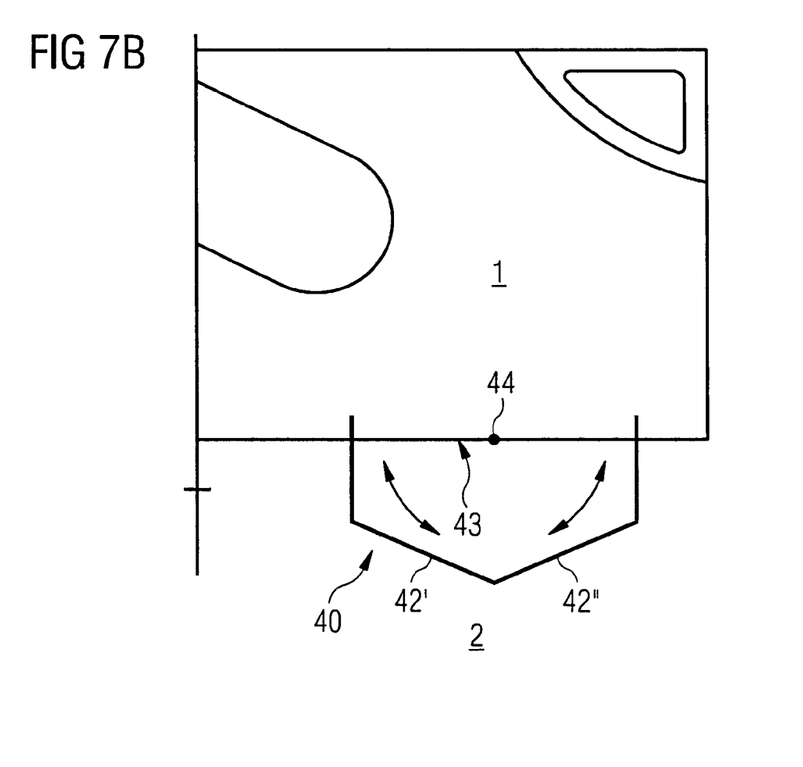

FIGS. 7A and 7B show a further alternative door assembly 40 with a door element 42', 42" having an exemplary concentric contour which, however, may be replaced by any suitable concentric contour. Otherwise, the structure and the function of the door assembly 40 according to FIGS. 7A and 7B correspond to the structure and the function of the door assembly 20 according to FIGS. 4A and 4B.

As already mentioned, the door element 12, 32 depicted in FIGS. 1 and 5 may be swung open from its first closed position in order to allow a passenger to enter the lavatory 1 and the door element 12, 32 is then returned into its first closed position when the lavatory 1 is occupied. In contrast thereto, in the arrangement according to FIGS. 2, 4 and 7, the door element 22, 22', 22", 42', 42" has no such open position but is rotated around a passenger who wants to enter or exit the lavatory 1 between its first and second position.

Regarding the first and second closed positions, the door elements 12, 32 according to FIGS. 1 and 5 are generally positioned in its first closed positions (FIGS. 1A and 5A) when the lavatory 1 may be used during the flight and are generally positioned in its second closed positions (FIGS. 1B and 5B) during taxi, takeoff and landing as well as the time passengers enter or leave the aircraft. Thereby, the usable space within the aircraft lavatory 1 is increased so as to enhance the comfort of the passenger and, at the same time, when the lavatory 1 may not be used, the door elements 12, 32 in its second closed positions increase a usable space within the passenger doorway area 2 adjacent the lavatory 1, thereby providing additional assist space for a crew member during passengers entering or leaving the aircraft.

Regarding the embodiments shown in FIGS. 2, 4 and 7, the door element 22, 22', 22", 42', 42" generally is positioned in its second closed position (FIG. 2A, 4A, 7A) when the lavatory 1 may be used but is not occupied and only turned into its first closed position (FIG. 2B, 4B, 7B) when the lavatory 1 is occupied. Therefore, it is not necessary to specially rotate the door element 22, 22', 22", 42', 42" into its second closed position when the lavatory 1 may no longer be used or may still not be used so as to provide the desired increased space in the passenger doorway area 2 adjacent the lavatory 1.

Throughout the figures, respective arrows indicate the directions of rotation and/or pivot of the depicted door elements 12, 22, 22', 22", 32, 42', 42" around the door element rotation and/or pivot axes 14, 24, 34, 36, 44.

Irrespective of the door configuration, the door element 12, 22, 22', 22", 32, 42', 42" may be rotatable between its closed positions manually or automatically, as has been described above in the general description part (Summary).

Further, each of the above described aircraft interior door assemblies 10, 20, 30, 40 may provide for the door element being lockable relative to the door element supporting structure at least in its first closed position, i.e., at least in the position where the lavatory 1 may be occupied, as has been described above in the general description part (Summary).

The above described embodiments allow to relocate the assist space form the passenger doorway area 2 into a space which is part of a lavatory 1 during the flight. Thereby, the last seating row can be installed more rearward and/or even the integration of additional seats is possible, which is desirable from a cost point of view. At the same time, the lavatory interior space is increased at least during the flight, i.e., when the lavatory 1 may be used, so that the comfort of the passenger is increased.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

The invention claimed is:

1. An aircraft interior door assembly for selectively increasing a usable space within an aircraft lavatory adjacent a passenger doorway area of the aircraft or in the passenger doorway area adjacent the lavatory, the aircraft interior door assembly comprising:
   a door element; and a door element supporting structure, wherein the door element is rotatably mounted to the door element supporting structure about a central axis so as to be rotatable about the central axis between a first closed position relative to the door element supporting structure and a second closed position relative to the door element supporting structure, the door element having the same configuration in both of the closed positions, and wherein a door rotation space encompassed by the door element when positioned in the first and second closed positions is part of the aircraft lavatory interior space, when the door element is in the first closed position, and is part of the passenger doorway area, when the door element is in the second closed position, wherein, when the door element is in the second closed position, the entire door rotation space forming part of the passenger doorway area is usable as assist space allowing a crew member to stand therein while passengers enter or leave the aircraft.

2. The aircraft interior door assembly according to claim 1, wherein the door rotation space is in the form of at least a sector of a circular cylinder.

3. The aircraft interior door assembly according to claim 1, wherein the door element supporting structure defines at least a width of a door opening for accommodating the door element, and the rotation axis of the door element extends mid-span within the door opening width.

4. The aircraft interior door assembly according to claim 3, wherein the door element defines an access area in the form of the door rotation space, when in the second closed position.

5. The aircraft interior door assembly according to claim 3, wherein the door element further has a pivot axis extending in parallel to the door element rotation axis in an edge region of the door element.

6. The aircraft interior door assembly according to claim 5, wherein the door element is pivotable into an open position relative to the door element supporting structure around the pivot axis.

7. The aircraft interior door assembly according to claim 3, wherein the door element is rotatable between the closed positions manually or automatically.

8. The aircraft interior door assembly according to claim 1, wherein the door element is a semi-circular tube.

9. The aircraft interior door assembly according to claim 1, wherein the door element supporting structure is part of a lavatory monument assembly and/or of aircraft structural components.

10. An aircraft lavatory adjacent a passenger doorway area of the aircraft, the aircraft lavatory provided with an aircraft interior door assembly, comprising:

a door element; and a door element supporting structure, wherein the door element is rotatably mounted to the door element supporting structure about a central axis so as to be rotatable about the central axis between a first closed position relative to the door element supporting structure and a second closed position relative to the door element supporting structure, the door element having the same configuration in both of the closed positions, and wherein a door rotation space encompassed by the door element when positioned in the first and second closed positions is part of the aircraft lavatory interior space, when the door element is in the first closed position, and is part of the passenger doorway area, when the door element is in the second closed position, wherein, when the door element is in the second closed position, the entire door rotation space forming part of the passenger doorway area is usable as assist space allowing a crew member to stand therein while passengers enter or leave the aircraft.

11. The aircraft lavatory according to claim 10 wherein the door element supporting structure defines at least a width of a door opening for accommodating the door element, and the central axis of the door element extends mid-span within the door opening width.

12. An aircraft lavatory according to claim 11, wherein the door element is a semi-circular tube, wherein the door element defines an access area in the form of the door rotation space, when in the second closed position; and wherein the door element further has a pivot axis extending in parallel to the door element rotation axis in an edge region of the door element.

13. The aircraft lavatory according to claim 12, wherein the door element is rotatable between the closed positions manually or automatically, wherein the door element is pivotable into an open position relative to the door element supporting structure around the pivot axis; and wherein the door element supporting structure is part of a lavatory monument assembly and/or of aircraft structural components.

14. The aircraft lavatory according to claim 10, wherein the door rotation space is in the form of at least a sector of a circular cylinder.

15. The aircraft lavatory according to claim 10, wherein a second rotation axis of the door element extends along an outer edge thereof.

* * * * *